United States Patent
Sen

(10) Patent No.: US 9,591,210 B2
(45) Date of Patent: Mar. 7, 2017

(54) IMAGE PROCESSING FACE DETECTION APPARATUS, METHOD FOR CONTROLLING THE SAME, AND PROGRAM

(71) Applicant: Sony Corporation, Tokyo (JP)

(72) Inventor: Seigo Sen, Tokyo (JP)

(73) Assignee: SONY CORPORATION, Tokyo (JP)

( * ) Notice: Subject to any disclaimer, the term of this patent is extended or adjusted under 35 U.S.C. 154(b) by 159 days.

(21) Appl. No.: 13/765,401

(22) Filed: Feb. 12, 2013

(65) Prior Publication Data

US 2013/0235228 A1    Sep. 12, 2013

(30) Foreign Application Priority Data

Mar. 6, 2012  (JP) ................................. 2012-048721

(51) Int. Cl.
  *H04N 5/232*  (2006.01)
  *G06K 9/00*  (2006.01)

(52) U.S. Cl.
  CPC ..... *H04N 5/23219* (2013.01); *H04N 5/23216* (2013.01); *H04N 5/23222* (2013.01); *G06K 9/00315* (2013.01)

(58) Field of Classification Search
  None
  See application file for complete search history.

(56) References Cited

U.S. PATENT DOCUMENTS

| | | | |
|---|---|---|---|
| 2007/0195174 A1* | 8/2007 | Oren | 348/222.1 |
| 2008/0117310 A1* | 5/2008 | Kaneda et al. | 348/231.2 |
| 2009/0115864 A1* | 5/2009 | Ogawa | 348/222.1 |
| 2010/0157084 A1* | 6/2010 | Shimamura et al. | 348/222.1 |
| 2011/0002678 A1* | 1/2011 | Misawa | 396/63 |
| 2011/0109770 A1* | 5/2011 | Katoh | 348/231.99 |
| 2012/0050601 A1* | 3/2012 | Lee | H04N 5/23293 348/341 |

FOREIGN PATENT DOCUMENTS

| | | |
|---|---|---|
| JP | 2004-046591 | 2/2004 |
| JP | 2005-157679 | 6/2005 |
| JP | 2009-217758 | 9/2009 |
| JP | 2010-117948 | 5/2010 |
| JP | 2011-030163 | 2/2011 |

* cited by examiner

Primary Examiner — Justin P Misleh
(74) Attorney, Agent, or Firm — Chip Law Group

(57) ABSTRACT

An image processing apparatus includes a face detection unit which detects faces from an input image, an evaluation value calculation unit which calculates an evaluation value expressing a degree of a facial expression for each of the facial expressions of the faces detected by the face detection unit, and a control unit which changes a standard for extracting an image such that an image including the facial expressions, that a small number of people have, is easily extracted, based on the number of people for each of the facial expressions of the faces detected by the face detection unit and an evaluation value for each facial expression of the face calculated by the evaluation value calculation unit.

16 Claims, 11 Drawing Sheets

IMAGE PROCESSING FACE DETECTION APPARATUS, METHOD FOR CONTROLLING THE SAME, AND PROGRAM

BACKGROUND

The present disclosure relates to an image processing apparatus, an image processing method, and a program, and more particularly to an image processing apparatus, an image processing, and a program which are configured to obtain an image having high level of satisfaction even when facial expressions of a plurality of image-captured people are different.

In recent years, an image processing technology of processing a digital operation based on an image signal has been rapidly progressed. As the example, a technology of detecting a face of a person from an image is disclosed (for example, Japanese Unexamined Patent Application Publication No. 2005-157679). This face detection technology has been developed to be installed on a digital type imaging apparatus which performs imaging with a solid imaging device such as a digital still camera. In addition, in recent years, a technology of recognizing a facial expression of a detected face has been noticed.

For example, in Japanese Unexamined Patent Application Publication No. 2004-046591, a technology, which evaluates a facial expression of a face of an image-captured person for each captured image from an image signal in which a plurality of frames are continuously captured, and selects an appropriate image from the evaluation information, has been proposed.

Further, in Japanese Unexamined Patent Application Publication No. 2009-217758, a technology which performs an evaluation as an image, not just an evaluation of a face included in an image has been proposed.

Further, in Japanese Unexamined Patent Application Publication No. 2010-117948, a technology, which has two kinds of facial expression determination modes and selects a determination mode, whether the mode is a speed priority, an accuracy priority, a manual operation by a user, or the like, in response to the number of detected faces, has been proposed.

On the other hand, in an imaging apparatus, so-called a self-timer function (an automatic imaging function) in which a shutter is automatically released after a predetermined time elapses from an operation of pressing a shutter button is generally installed not only in a silver-salt camera, but also in a digital still camera.

However, in the automatic imaging function, the time when the shutter is released is previously determined, so that it does not guarantee that an image-captured person necessarily has a good facial expression at the time when the shutter is released and an unsatisfactory picture has been frequently captured.

In response, in Japanese Unexamined Patent Application Publication No. 2011-030163, a technology has been proposed which conducts functional improvement in the automatic imaging function by changing the frequency when imaging and recording are performed in an automatic imaging function, for example.

SUMMARY

However, in the related art, there has not been a proposal relating to the automatic imaging function in a case where the facial expressions of a plurality of image-captured people are different.

Therefore, considering the above situation, it is desirable to obtain an image having high level of satisfaction, even when the facial expressions of a plurality of image-captured people are different.

An image processing apparatus according to an embodiment of the present disclosure includes: a face detection unit which detects faces from an input image; an evaluation value calculation unit which calculates an evaluation value expressing a degree of a facial expression for each of the facial expressions of the faces detected by the face detection unit; and a control unit which changes a standard for extracting an image such that an image including the facial expressions of a small number of people are easily extracted based on the number of people for each of the facial expressions of the faces detected by the face detection unit and an evaluation value for each facial expression of the face is calculated by the evaluation value calculation unit.

When there are a plurality of facial expressions that a small number of people have, the control unit may change the standard such that an image including a facial expression, that a largest number of children have, is easily extracted out of facial expressions that a small number of people have.

When there are a plurality of facial expressions that a small number of people have, the control unit may change the standard such that an image including a facial expression, which people having the facial expressions that a small number of people have are close to a center of an angle of view, is easily extracted out of facial expressions that a small number of people have.

The image processing apparatus may further include an extraction unit which extracts an image including the facial expressions that a small number of people have, based on the standard changed by the control unit.

The process by the extraction unit is a process of recording the input image.

The process by the extraction unit is a process of automatically releasing a shutter.

The process by the extraction unit is an instruction process to a user.

The process by the extraction unit is a process of applying metadata.

The image processing apparatus may further include an imaging unit which captures an object and inputs the input image, and a camera platform control unit which controls an operation of a camera platform on which a casing including the imaging unit is installed.

The image processing apparatus may further include a standard adjustment unit which adjusts the standard changed by the control unit in a direction to return the standard to an original, when an extraction process is performed by the extraction unit.

The standard adjustment unit may adjust the standard changed by the control unit in a direction to further change the standard, when a predetermined time elapses.

The control unit may change the standard for extracting the image, by lowering or raising a threshold value corresponding to the evaluation value.

The control unit may change the standard for extracting the image, by applying a gain to the evaluation value.

Further, an image processing method according to an embodiment of the present disclosure includes detecting faces from the input image, calculating an evaluation value expressing a degree of a facial expression for each of facial expressions of the detected faces, and changing a standard for extracting an image such that an image including the facial expressions of a small number of people, is easily extracted, based on the number of people for each of the facial expressions of the detected faces and an evaluation value for each facial expression of the calculated faces.

Furthermore, a program according to an embodiment of the present disclosure causes a computer to function as a face detection unit which detects faces from an input image, an evaluation value calculation unit which calculates an evaluation value expressing a degree of a facial expression for each of the facial expressions of the faces detected by the face detection unit, and a control unit which changes a standard for extracting an image such that an image including the facial expressions, that a small number of people have, is easily extracted, based on the number of people for each of the facial expressions of the faces detected by the face detection unit and an evaluation value for each facial expression of the face calculated by the evaluation value calculation unit.

According to an embodiment of the present disclosure, faces are detected from input image, and an evaluation value expressing a degree of a facial expression for each of facial expressions of the detected faces is calculated. Then, a standard for extracting an image is changed such that an image including the facial expressions, that a small number of people have, is easily extracted, based on the number of people for each of the facial expressions of the detected faces and an evaluation value for each facial expression of the calculated faces.

According to an embodiment of the present disclosure, an image may be extracted. Specially, an image having high level of satisfaction may be obtained, even when the facial expressions of image-captured people are different.

DETAILED DESCRIPTION OF EMBODIMENTS

Hereinafter, embodiments of implementing the present disclosure (hereinafter, referred to as embodiments) will be described.

Configuration Example of Imaging Apparatus

Figure 1:
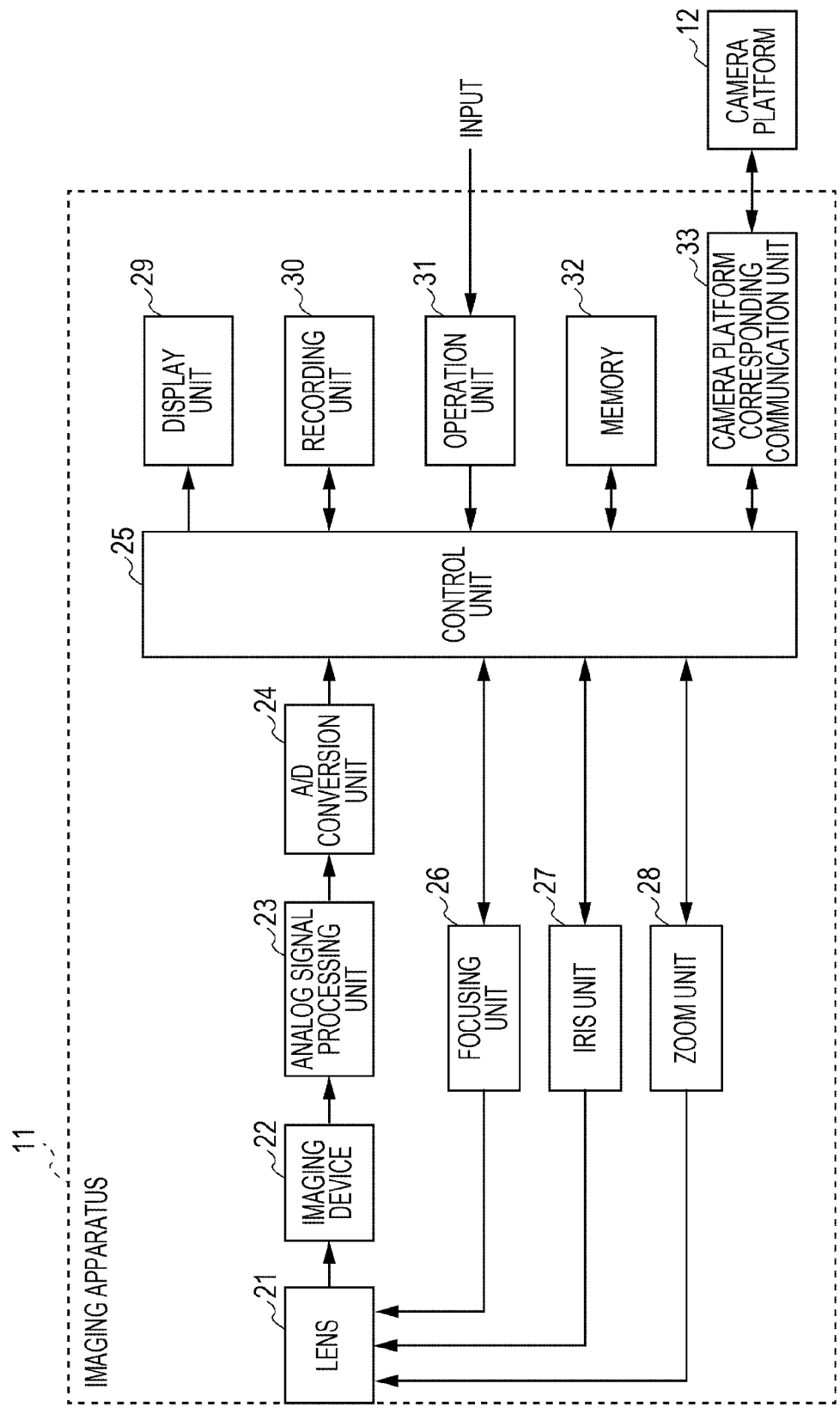
FIG. 1 is a block diagram illustrating a configuration example of an imaging apparatus to which the present technology is applied.

FIG. 1 is a block diagram illustrating a configuration example of an imaging apparatus as an example of the imaging apparatus to which the present technology is applied.

An imaging apparatus 11 shown in FIG. 1 is configured by a digital still camera, etc., and may be installed on the camera platform 12, thereby being connected to a camera platform 12.

The camera platform 12 may perform control using communication with the imaging apparatus 11 that is installed (connected) thereon in order to capture an object from various angles, that is, the camera platform 12 rotates the imaging apparatus 11 in the right and left directions (pan: a horizontal direction) or raises or lowers the angle of view of the imaging apparatus 11 (tilt: vertical direction). In addition, an operation control may be configured to be embedded in the camera platform 12.

The imaging apparatus 11 is configured to include a lens 21, an imaging device 22, an analog signal processing unit 23, an A/D conversion unit 24, a control unit 25, a focusing unit 26, an iris unit 27, and a zoom unit 28. Further, the imaging apparatus 11 is configured to include a display unit 29, a recording unit 30, an operation unit 31, a memory 32, and a camera platform corresponding communication unit 33.

The lens 21 has a focusing mechanism, an iris mechanism and a zoom mechanism which are not shown. An image is formed in the imaging device 22 by object light through the lens 21. The imaging device 22 is configured by, for example, a photoelectric conversion device such as a Charge Coupled Device (CCD) or a Complementary Metal Oxide Semiconductor (CMOS). The imaging device 22 receives the object light which is to form an image, converts the light into an electric signal, and outputs the converted electric signal to the analog signal processing unit 23.

The analog signal processing unit 23 performs a signal process such as a gamma correction or a white balance with respect to the electric signal from the imaging device 22, and outputs the electric signal after the signal process to the A/D conversion unit 24. The A/D conversion unit 24 performs A/D conversion with respect to the electric signal from the analog signal processing unit 23, and outputs the digital image data after conversion to the control unit 25.

The control unit 25 is a control circuit which collectively controls the operation of each unit of the imaging apparatus 11, based on the operation signal from the operation unit 31 or the program developed in the memory 32. That is, the control unit 25 performs a predetermined process with respect to the digital image data from the A/D conversion unit 24, displays the image data after the process on the display unit 29 or records the image data after the process in the recording unit 30 or the memory 32. Further, the control unit 25 performs imaging control by controlling the focusing unit 26, the iris unit 27 and the zoom unit 28. Further, the control unit 25 controls the operation such as pan•tilt of the camera platform 12, in an automatic imaging mode, by communicating in the camera platform corresponding communication unit 33.

The focusing unit 26 drives the focusing mechanism of the lens 21. The iris unit 27 drives the iris mechanism of the lens 21. The zoom unit 28 drives the zoom mechanism of the lens 21.

The display unit 29 is formed of, for example, a liquid crystal display device, and displays the image corresponding to the image data for display which is made in the control unit 25. The recording unit 30 is formed of an IC memory card or an embedded memory, and records the data from the control unit 25.

The operation unit 31 is formed of a touch panel which is layered on the display unit 29, or buttons, a switch, and a dial which are provided in a casing body, and inputs a signal corresponding to the operation of a user to the control unit 25. For example, when the operation unit 31 is configured by the touch panel, the operation unit 31 detects an operation of a user and inputs a signal corresponding to the detected position to the control unit 25.

The memory 32 is configured by a Random Access Memory (RAM) and the like, and is used as a region in which the predetermined program is developed or a temporal recording region in which data processed in the control unit 25 is stored.

The camera platform corresponding communication unit 33 performs communication with the camera platform 12 in a predetermined communication manner. For example, the camera platform corresponding communication unit 33 transmits the operation control signal from the control unit 25 to the camera platform 12, and transmits the reply signal from the camera platform 12 to the control unit 25.

Configuration Example of Control Unit

Figure 2:
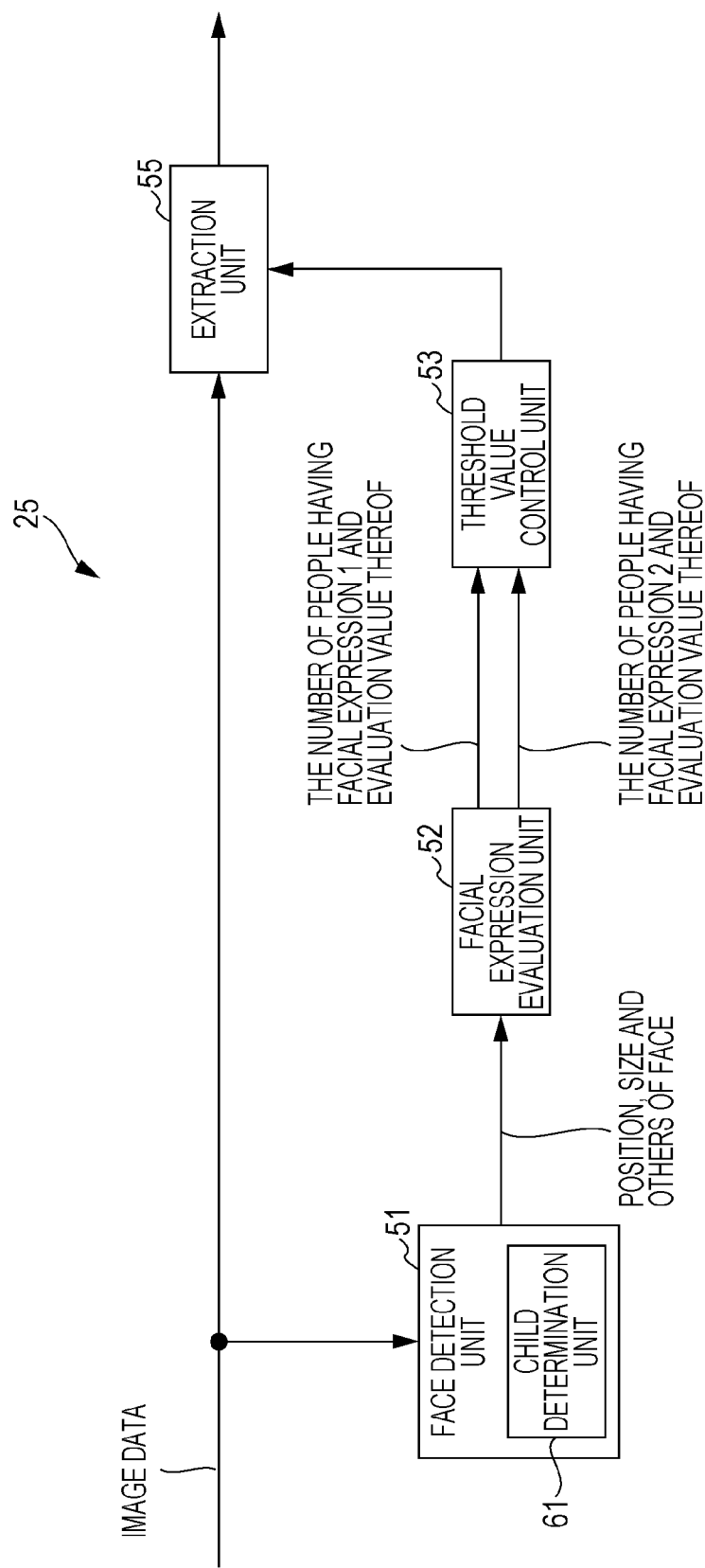
FIG. 2 is a block diagram illustrating a configuration example of a control unit.

FIG. 2 is a diagram illustrating a configuration example of a control unit in the case where an operation mode of a camera transits to an automatic imaging mode. The transition to the automatic imaging mode is performed in response to an instruction to cause the automatic imaging mode ON by the user through, for example, the operation unit 31.

In an example of FIG. 2, the control unit 25 is configured to include a face detection unit 51, a facial expression evaluation unit 52, a threshold value control unit 53 and an extraction unit 55.

The image data from the A/D conversion unit 24 is input to the face detection unit 51 and the extraction unit 55. Further, the image data is input to the display unit 29, and the still image is displayed on the display unit 29.

The face detection unit 51 detects a human face from an image of image data from the A/D conversion unit 24, and supplies the facial expression evaluation unit 52 with information relating to positions, sizes or the like of the detected faces when a plurality of the detected faces are present. Further, in face detection, for example, the technology disclosed in Japanese Unexamined Patent Application Publication No. 2005-157679 is used. In addition, a child determination unit 61 is embedded in the face detection unit 51. The child determination unit 61 determines whether there is a face of child or a face of an adult out of the detected human faces, supplies the facial expression evaluation unit 52 with the determination result. Here, determination of whether there is a face of child or a face of an adult is performed using each learning data of an adult or a child.

The facial expression evaluation unit 52 calculates an evaluation value of a facial expression 1, an evaluation value of a facial expression 2 and an evaluation value of a facial expression 3 with respect to a facial expression of each of the faces detected from the image by the face detection unit 51. Then, the facial expression evaluation unit 52 determines to which one of the facial expression 1 to the facial expression 3 a facial expression of each detected face is classified, and adds the evaluation value of the classified facial expression. The facial expression 1 to the facial expression 3 are the types of facial expressions, and include, for example, a smiley face, a crying face, a proud face, an angry face and a funny face. Further, the facial expressions may be classified into more faces, without being limited to three kinds of facial expressions.

The facial expression evaluation unit 52 supplies the threshold value control unit 53 with the number of people having each of the facial expression 1 to the facial expression 3 that are determined and the respective evaluation values. In addition, the facial expression evaluation unit 52 supplies the threshold value control unit 53 with information relating to the position of the face detected by the face detection unit 51 or the result of determination of whether there is a child or an adult from the child determination unit 61, as necessary.

The threshold value control unit 53 keeps respective threshold value with respect to each of the facial expression 1 to the facial expression 3. The threshold value control unit 53 changes, for example, the threshold value of the expression that a small number of people have, using information from the facial expression evaluation unit 52, based on the number of people having each of the facial expression 1 to facial expression 3 that are determined, and respective evaluation values. The threshold value control unit 53 supplies the extraction unit 55 with the evaluation values of the facial expression 1 to the facial expression 3 and the respective threshold values corresponding to the respective evaluation values.

The extraction unit 55 performs a shutter process that is a process to extract (select) only one part in the image from the image data which is input, when all of the evaluation values of the facial expression 1 to the facial expression 3 are equal to or greater than the respective corresponding threshold values.

As an example of extracting an image in the extraction unit 55, the shutter process is performed with respect to the image data which is input. Here, the shutter process represents an automatic shutter process. That is, the extraction unit 55 extracts the image that satisfies a threshold value (a standard). The extraction unit 55 supplies the extracted (that is, the shutter process is performed) image data to the recording unit 30, and allows the extracted data to be recorded thereon.

That is, the automatic imaging mode in the imaging apparatus 11 is a mode in which the automatic shutter process is performed when all the evaluation values of the facial expressions are equal to or greater than the respective corresponding threshold values.

In addition, other than the shutter process, examples of the image extraction include a process which adds metadata to the corresponding image out of a plurality of images or a process which records only the corresponding image out of a plurality of images.

Outline of the Imaging Process Using the Automatic Imaging Mode

Next, the description about an outline of the imaging process using the above described automatic imaging mode will be made referring to FIG. 3.

The object light forms an image in the imaging device 22 through the lens 21. The imaging device 22 receives the object light which forms an image, converts the light into an electric signal, and outputs the converted electric signal to the analog signal processing unit 23. The analog signal processing unit 23 performs signal processes such as a gamma correction or a white balance with respect to the electric signal from the imaging device 22, and outputs the electric signal after the signal process to the A/D conversion unit 24. The A/D conversion unit 24 performs A/D conversion with respect to the electric signal from the analog signal processing unit 23, and outputs the digital image data after conversion to the control unit 25.

Figure 3C:
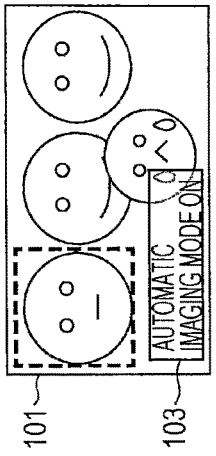
FIG. 3A to 3G are diagrams illustrating an outline of the imaging process using an automatic imaging mode.
Figure 3F:
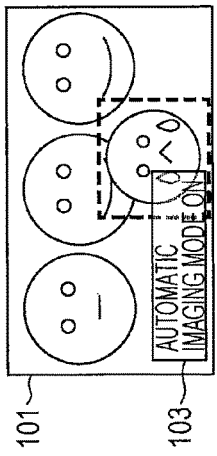
Figure 3B:
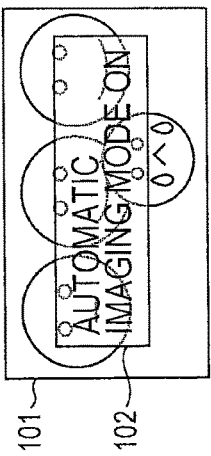
Figure 3E:
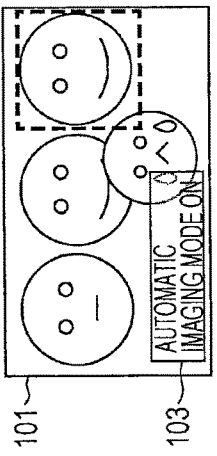
Figure 3A:
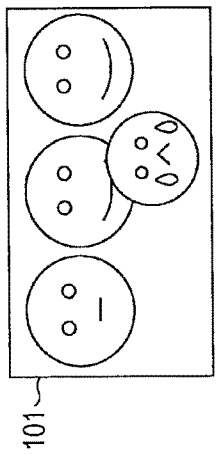

The control unit 25 outputs the digital image data to the display unit 29, and the image 101 corresponding to the digital image data which is shown in FIG. 3A is displayed on the display unit 29. The image 101, in which three people are on the upper side and a person having a crying facial expression is on the lower middle side, is displayed on the display unit 29. The people on the upper side have no facial expression, a smiley facial expression and a smiley facial expression from the left.

In this status, the user sets the automatic imaging mode to "ON" using the operation unit 31. The control unit 25 reads the polling process of the automatic imaging mode ON which is input through the operation unit 31 and changes the operation mode of the imaging apparatus 11 into the automatic imaging mode. Then, the control unit 25 overlaps the image 102 of "the automatic imaging mode ON" on the image 101 of the display unit 29, as shown in FIG. 3B, and activates respective parts in FIG. 2.

The face detection unit 51 detects four human faces from the image of image data from the A/D conversion unit 24, and supplies the facial expression evaluation unit 52 with information such as the positions and the sizes of the detected faces.

First, as illustrated by dots in FIG. 3C, the facial expression evaluation unit 52 calculates the evaluation value of each facial expression with respect to the person on the upper left side. The facial expression of the person on the upper left side is determined as no facial expression, based on the evaluation value of each detected facial expression. In a case of no facial expression, the facial expression of the person is not classified into any one. In addition, after transition to the automatic imaging mode, the image 103 expressing "the automatic imaging mode ON" is displayed on the lower left side in a smaller size than the image when the transition to the automatic imaging mode is on the process.

Figure 3D:
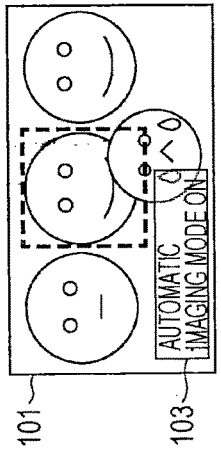

Next, the facial expression evaluation unit 52 calculates the evaluation value of each facial expression, as shown with dots in FIG. 3D, with respect to the person on the upper middle side. The facial expression of the person on the upper middle side is classified as a smiley face (a facial expression 1), based on the evaluation value of each calculated facial expression, and the number of the smiley face becomes two.

Next, the facial expression evaluation unit 52 calculates the evaluation value of each facial expression, as shown with dots in FIG. 3E, with respect to the person on the upper right side. The facial expression of the person on the upper right side is classified as a smiley face (a facial expression 1), based on the evaluation value of each calculated facial expression, and the number of the smiley face becomes three.

Next, the facial expression evaluation unit 52 calculates the evaluation value of each facial expression, as shown with dots in FIG. 3F, with respect to the person on the lower middle side. The facial expression of the person on the lower middle side is classified as a crying face (a facial expression 2), based on the evaluation value of each calculated facial expression, and the number of the crying face becomes one. Further, the dots in FIGS. 3C to 3F are shown only for the convenience of explanation, and are not shown in the real image 101.

When the facial expression evaluation unit 52 compares the number of people whose facial expression are detected and the number four of people within the angle of view with the number four of people detected within the angle of view, if all numbers are same, the facial expression evaluation unit 52 ends the facial expression evaluation calculation process. The threshold value control unit 53 changes the standard referring to the evaluation value and the number of each facial expression in the image 101. For example, the threshold value control unit 53 changes the standard by lowering the threshold value of the crying face that the smallest number of people have, by one step. The threshold value control unit 53 supplies the extraction unit 55 with the evaluation values of the facial expression 1 to the facial expression 3 and the corresponding threshold values.

Figure 3G:
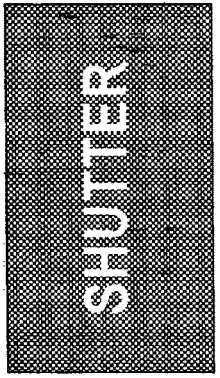

Then, the extraction unit 55 performs the shutter process when each of the evaluation values of the facial expression 1 to the facial expression 3 exceeds the respective corresponding threshold value and the evaluation values of the facial expression 2 (crying face) exceeds the threshold value of which standard is changed. The extraction unit 55 performs the shutter process which is a process for extracting the still image from the image data which is input as shown in FIG. 3G, and supplies the recording unit 30 with the still image data on which the shutter process is performed, that is, extracted, and allows the extracted data to be recorded thereon.

That is, in the automatic imaging mode, when each of the evaluation values of all facial expressions exceeds the respect threshold value, the still image is extracted. Accordingly, even if all the people do not have smiley faces, that is, facial expressions are different, the still image is extracted.

Then, in the change of the standard, by lowering the threshold value by one step, the determination standard of the determination process with respect to the image extraction is loosened. The determination standard is loosened, so that the facial expression of which standard is changed, that is, the facial expression that the smallest number of people have is easily extracted.

There are many cases, in which the person, having a face different from the faces of the surrounding people, in other words, the person having a face of the facial expression that the smallest number of people have, may be a central character or a leading character, preferably, the image of that person has been desired to be extracted (taken). Thus, by performing as above, the image of the person (a leading role) having the facial expression that the smallest number of people have may be captured more.

Further, although the threshold value is lowered by one step, the number of the step is not limited to one. In addition, a standard changing method is not limited to the lower the threshold value, if it is a standard changing method in which an image including the expression that the small number of people have is easily extracted, any method may be used. For example, the threshold value of the facial expression that a large number of people have may be raised, or a gain more than one may be applied to the evaluation value of the facial expression that a small number of people have.

Example of Imaging Process Using the Automatic Imaging Mode

Next, the imaging process using the automatic imaging mode of the imaging apparatus 11 will be described referring to FIG. 4. For example, in the process described above, the user sets the automatic imaging mode to ON using the operation unit 31. In response, the operation mode of the imaging apparatus 11 is transited to the automatic imaging mode by the control unit 25, thereby being started.

The imaging device 22 receives the object light which forms an image through the lens 21, converts the light into an electric signal, and outputs the converted electric signal to the analog signal processing unit 23. The analog signal processing unit 23 performs a signal process such as a gamma correction or a white balance with respect to the electric signal from the imaging device 22, and outputs the electric signal after the signal process to the A/D conversion unit 24. Then, the image data that is A/D converted by the A/D conversion unit 24 is input to the face detection unit 51.

In step S11, the face detection unit 51 detects human faces from the image of the image data from the A/D conversion unit 24, and calculates the number of people within the angle of view based on the detected human faces. In step S12, the face detection unit 51 determines whether the number of people within the angle of view is equal to or greater than one.

In step S12, when the face detection unit 51 determines that the number of people within the angle of view is equal to or greater than one, the face detection unit 51 supplies the facial expression evaluation unit 52 with the information relating to positions, sizes or the like of the detected faces, and then the process proceeds to step S13.

In step S13, the facial expression evaluation unit 52 performs the facial expression evaluation calculation process. The detailed description of the facial expression evaluation calculation process will be made below, referring to FIG. 5. Through the process of step S13, the determined number of people of each of the facial expression 1 to the facial expression 3 and respective evaluation values are calculated. The calculated number of people of each of the facial expression 1 to the facial expression 3 and respective evaluation values are supplied to the threshold value control unit 53.

In step S14, the threshold value control unit 53 determines whether there is a facial expression that the smallest number of people have, referring to the number of people of each of the facial expression 1 to the facial expression 3 and respective evaluation values from the facial expression evaluation unit 52. For example, when the number of the facial expression 1 (a smiley face) is two, the number of the facial expression 2 (a crying face) is one and the number of the facial expression 3 (a proud face) is two, in step S14, it is determined that there is the facial expression that the smallest number of people have, and then the process proceeds to step S15.

In step S15, the threshold value control unit 53 lowers the threshold value of the facial expression 2 (a crying face) that is a facial expression that the smallest number of people have, by one step. Further, in an example of FIG. 4, even in a case when there is a plurality of facial expressions that the smallest number of people have, the process proceeds to step S15. In step S15, the threshold value is lowered with respect to the facial expressions that the smallest number of people have. Then, the threshold value control unit 53 supplies the extraction unit 55 with the evaluation values of the facial expression 1 to the facial expression 3 and the respective threshold values corresponding to the respective evaluation values.

In step S14, in a case where there is no facial expression that the smallest number of people have, the step S15 is skipped, and then the process proceeds to step S16. Further, even when the number of people within the angle of view is either one or two, in step S14, it is determined that there is no facial expression that the smallest number of people have. Then, the threshold value control unit 53 supplies the extraction unit 55 with the evaluation values of the facial expression 1 to the facial expression 3 and the respective threshold values corresponding to the respective evaluation values.

In step S16, the extraction unit 55 determines whether the evaluation value of each facial expression respectively exceeds the corresponding threshold value. In step S16, in a case where it is determined that the evaluation value of each facial expression respectively exceeds the corresponding threshold value, the process proceeds to step S17.

In step S17, the extraction unit 55 extracts the image from the image data which is input. The extraction unit 55 supplies the recording unit 30 with the extracted (that is, the shutter process is performed) image data, and allows the extracted data to be recorded thereon. Further, the number of times that the shutter process is performed is not limited to one, but the shutter process may be performed a plurality of times.

In step S16, when it is determined that the evaluation value of each facial expression does not respectively exceed the corresponding threshold value, that is, when it is determined that there is at least one of expression of which evaluation value does not exceed the corresponding threshold value, the step S17 is skipped and then the process proceeds to step S18.

Alternatively, in step S12, when the face detection unit 51 determines that the number of people within the angle of view is zero, the steps S13 to S17 are skipped, and then the process proceeds to step S18.

In step S18, the face detection unit 51 determines whether there is a process end instruction from the user through the operation unit 31. In step S18, when it is determined that there is not the process end instruction, the process returns to step S11, and then the subsequent processes are repeated.

In step S18, when there is the process end instruction, the process using the automatic imaging mode is ended.

As described above, when it is determined that there is a facial expression that the smallest number of people have, the threshold value of the facial expression that the smallest number of people have is lowered, and thereby increasing the possibility of obtaining the image including the facial expression that the smallest number of people have (that is, the expression of the person who may be in the center).

Further, in the case of the automatic imaging mode, in the process of step S18 it is determined whether the image is extracted. If the image is extracted once, the imaging process of FIG. 4 may be ended.

Figure 4:
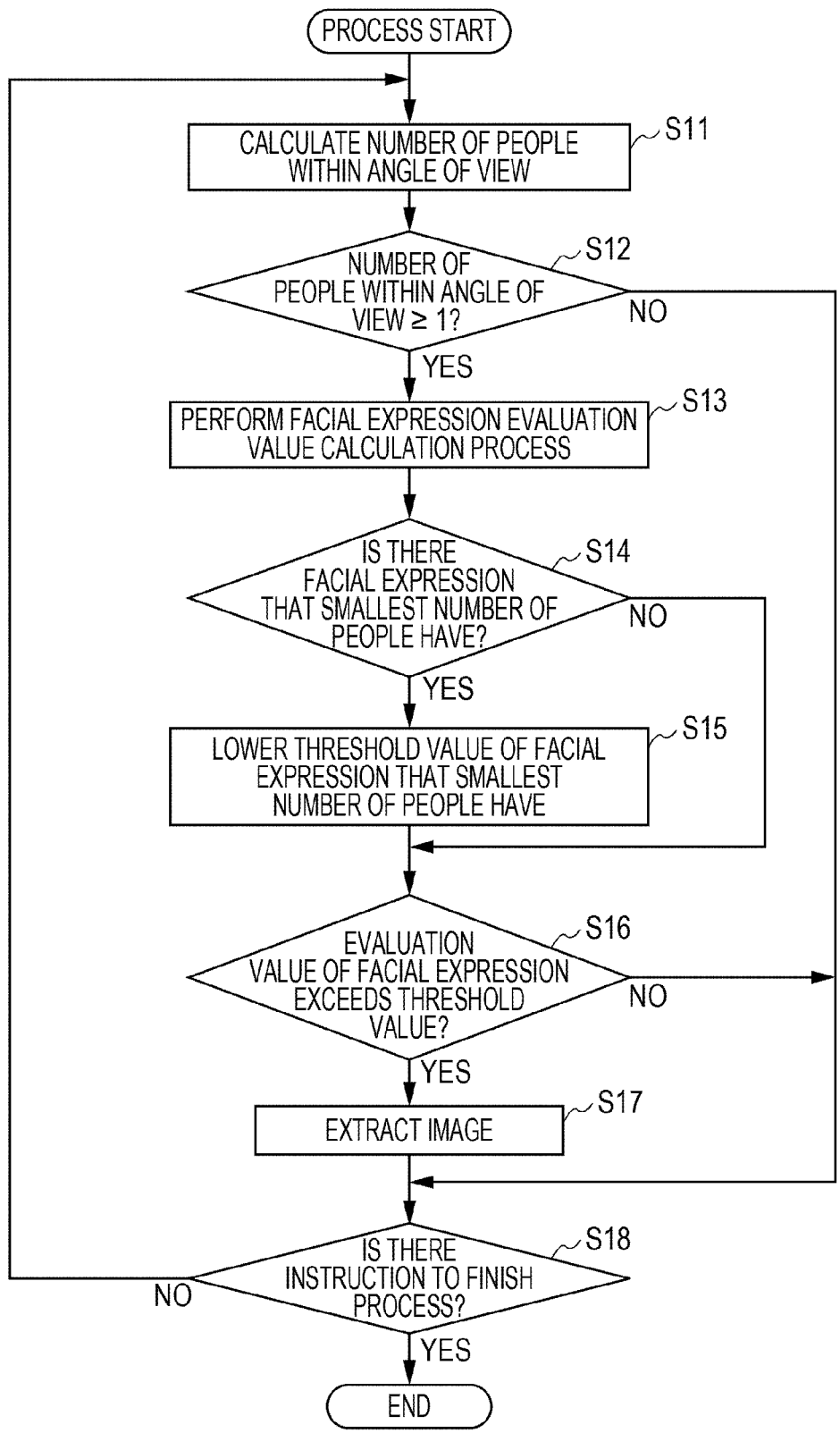
FIG. 4 is a flowchart illustrating an example of the imaging process using an automatic imaging mode.

In addition, when the imaging process of FIG. 4 is repeated, like the process of the automatic imaging mode in a case of using the camera platform 12 which will be described referring FIG. 8, after extracting the image, the threshold value adjustment may be performed.

Facial Expression Evaluation Value Calculation Process

Figure 5:
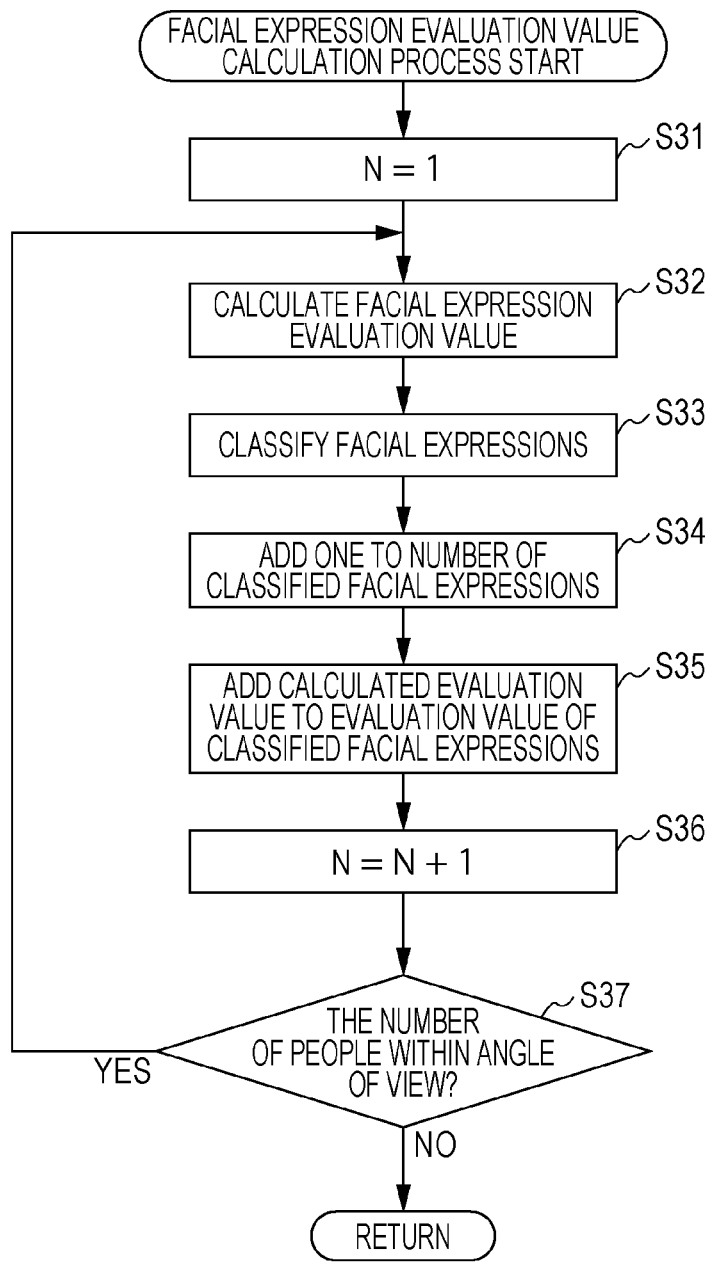
FIG. 5 is a flowchart illustrating a facial expression evaluation value calculation process.

The facial expression evaluation value calculation process of step S13 in FIG. 4 will be described referring to the flow chart in FIG. 5.

The facial expression evaluation unit 52 sets N=1 in step S31 and calculates the facial expression evaluation value of the first person in step S32. For example, with regard to the facial expression of the first person, the evaluation value of the facial expression 1 expressing the degree of the facial expression 1, the evaluation value of the facial expression 2 expressing the degree of the facial expression 2 and the evaluation value of the facial expression 3 expressing the degree of the facial expression 3 are respectively calculated.

In step S33, the facial expression evaluation unit 52 classifies the facial expression of the first person into any one facial expression of the facial expression 1 to the facial expression 3, based on the calculated evaluation value of each facial expression. In the facial expression evaluation unit 52, the classification is performed, for example, using the learned data with respect to each facial expression. In addition, the threshold value is used even at the time of classification in step S33, but the threshold value is smaller than the threshold value that is used to determine the time when an image extraction is performed, in step S16 in FIG. 4.

The facial expression evaluation unit 52 adds one to the number of people of the classified facial expression in step S34, and adds the evaluation value of the facial expression of the first person that is classified, out of the evaluation values calculated in the step S32, to the evaluation value of the classified facial expression in step S35.

The facial expression evaluation unit 52 sets N=N+1 in step S36, and determines whether N is no more than the number of people within the angle of view in step S37. In step S37, when it is determined that N is no more than the number of people within the angle of view, the process returns to step S32, and then the subsequent processes are repeated. In step S37, when it is determined that N is larger than the number of people within the angle of view, the facial expression evaluation value calculation process is ended.

Another Example of the Imaging Process Using the Automatic Imaging Mode

Next, an example of children priority in the imaging process using the automatic imaging mode of the imaging apparatus 11 will be described referring to a flowchart in FIG. 6. In addition, the processes of steps S51 to S54 and steps S59 to S61 in FIG. 6 fundamentally are the same as the processes of steps S11 to S14 and steps S16 to S18 in FIG. 4 and the detailed description is repeated so that the description will be omitted.

In step S51, the face detection unit 51 detects a human face from an image of image data from the A/D conversion unit 24, and calculates the number of people within the angle of view, based on the detected human face. At this time, the child determination unit 61 determines whether there is a face of child or a face of an adult out of the detected human faces. In step S52, the face detection unit 51 determines whether the number of people within the angle of view is one or more.

When the face detection unit 51 determines that the number of people within the angle of view is one or more in step S52, the face detection unit 51 supplies the facial expression evaluation unit 52 with information such as the positions and the sizes of the detected faces, and then the process proceeds to step S53. The determination result of whether there is a child or an adult from the child determination unit 61 is also supplied to the facial expression evaluation unit 52 as necessary.

In step S53, the facial expression evaluation unit 52 performs the aforementioned facial expression evaluation value calculation process. Through the process of the step S53, the number of people of each of the facial expression 1 to the facial expression 3 which are determined and the respective evaluation values are calculated. The calculated number of people of each of the facial expression 1 to the facial expression 3 and the respective evaluation values are supplied to the threshold value control unit 53.

In step S54, the threshold value control unit 53 determines whether there is a facial expression that the smallest number of people have, referring to the number of people of each of the facial expression 1 to the facial expression 3 and the respective evaluation values from the facial expression evaluation unit 52. In step S54, when it is determined that there is a facial expression that the smallest number of people have, the process proceeds to step S55.

In step S55, the threshold value control unit 53 determines whether there are a plurality of facial expressions that the smallest number of people have. In step S55, when it is determined that there is only one facial expression that the smallest number of people have, the process proceeds to step S56. In step S56, the threshold value control unit 53 lowers the threshold value of the facial expression determined as that the smallest number of people have by one step, and supplies the extraction unit 55 with the evaluation values of the facial expression 1 to the facial expression 3 and the respective threshold values corresponding to the respective evaluation values, and then the proceeds to step S59.

For example, when the number of the facial expression 1 (a smiley face) is three, the number of the facial expression 2 (a crying face) is two and the number of the facial expression 3 (a proud face) is two, there are a plurality of facial expressions that the smallest number of people have, so that in step S55, it is determined that there are a plurality of facial expressions that the smallest number of people have, and then the process proceeds to step S57.

For example, even in a case of having the same number of facial expressions such as a case where the number of the facial expression 1 is one, the number of the facial expression 2 is one and the number of the facial expression 3 is one, and a case where the number of the facial expression 1 is two, the number of the facial expression 2 is two and the number of the facial expression 3 is two, or in another case where the number of the facial expression 1 is one, the number of the facial expression 2 is one and the number of the facial expression 3 is two, in step S55, it is determined that there are a plurality of facial expressions that the smallest number of people have.

Here, the determination resulting from the child determination unit 61 as to whether there is a face of child or a face of an adult is supplied to the threshold value control unit 53 through the facial expression evaluation unit 52. In step S57, the threshold value control unit 53 determines whether there is a facial expression that a large number of children have out of a plurality of facial expressions that the smallest number of people have. That is, when the facial expression of one person out of two people having the facial expression 2 (a crying face) is the facial expressions of children and the facial expressions of two out of two people having the facial expression 3 (a proud face) are the facial expressions of children, the facial expression 3 is determined as the facial expression that a large number of children have, out of the facial expressions that the smallest number of people have.

In step S57, when it is determined that there is a facial expression that a large number of children have out of a plurality of facial expressions that the smallest number of people have, it proceeds to step S58. In step S58, the threshold value control unit 53 lowers the threshold value of the facial expression (the facial expression 3) that a large number of children have, out of a plurality of facial expressions that the smallest number of people have by one step, and supplies the extraction unit 55 with the evaluation values of the facial expression 1 to the facial expression 3 and the respective threshold values corresponding to the respective evaluation values, and then the process proceeds to step S59.

In step S57, when it is determined that there is not a facial expression that a large number of children have, out of a plurality of facial expressions that the smallest number of people have, the process of the step S58 is skipped, and then the process proceeds to step S59. At this time, the threshold value control unit 53 supplies the extraction unit 55 with the evaluation values of the facial expression 1 to the facial expression 3 and the respective threshold values corresponding to the respective evaluation values.

In step S59, the extraction unit 55 determines whether the evaluation value of each of the facial expressions respectively exceeds the corresponding threshold value. In step S59, when it is determined that the evaluation value of each of the facial expressions respectively exceeds the corresponding threshold value, the process proceeds to step S60. In step S60, the extraction unit 55 extracts an image from an input image data. The extraction unit 55 supplies the recording unit 30 with the extracted (that is, the shutter process is performed) image data, and allows the extracted data to be recorded thereon.

Further, in step S59, when it is determined that there is at least one facial expression of which the evaluation value does not exceed the corresponding threshold value, the process of the steps S60 is skipped, the process proceeds to step S61.

Alternatively, in step S52, when the face detection unit 51 determines that the number of people within the angle of view is zero, the steps S53 to S60 are skipped, and then the process proceeds to step S61.

In step S61, the face detection unit 51 determines whether there is a process end instruction from the user through the operation unit 31. In step S61, when it is determined that there is not the process end instruction, the process returns to step S52, and then the subsequent processes are repeated.

In step S61, when it is determined that there is a process end instruction, the imaging process using the automatic imaging mode is ended.

As described above, when it is determined that there are a plurality of facial expressions that the smallest number of people have, it is configured to lower the threshold value of the facial expression that a large number of children have, out of a plurality of facial expressions that the smallest number of people have, and thereby increasing the possibility of obtaining the image that is the facial expression that the smallest number of people have and includes the facial expression that a large number of children have in that expression.

In a group in which a child is present, an image is frequently captured with the child as a center, and thereby increasing the possibility of obtaining the image of various facial expressions of a child.

Another Example of an Imaging Process Using the Automatic Imaging Mode

Next, an example of the center priority of the angle of view in the imaging process using the automatic imaging mode of the imaging apparatus 11 will be described referring to a flowchart in FIG. 7. In addition, the processes of steps S81 to S84 and steps S89 to S91 in FIG. 7 fundamentally are the same as the processes of steps S11 to S14 and steps S16 to S18 in FIG. 4 and the detailed description is repeated so that the description will be omitted.

In step S81, the face detection unit 51 detects human faces from the image of the image data from the A/D conversion unit 24, and calculates the number of people within the angle of view, based on the detected human faces. In step S82, the face detection unit 51 determines whether the number of people within the angle of view is equal to or greater than one.

In step S82, when the face detection unit 51 determines that the number of people within the angle of view is equal to or greater than one, the face detection unit 51 supplies the facial expression evaluation unit 52 with information relating to positions, sizes or the like of the detected faces, and then the process proceeds to step S83.

In step S83, the facial expression evaluation unit 52 performs the facial expression evaluation calculation process which is described above referring to FIG. 5. Through the process of step S83, the number of people of each of the facial expression 1 to the facial expression 3 which are determined and respective evaluation values are calculated. The calculated number of people of each of the facial expression 1 to the facial expression 3 and respective evaluation values are supplied to the threshold value control unit 53.

In step S84, the threshold value control unit 53 determines whether there is a facial expression that the smallest number of people have, referring to the number of people of each of the facial expression 1 to the facial expression 3 and the respective evaluation values from the facial expression evaluation unit 52. In step S84, when it is determined that there is a facial expression that the smallest number of people have, the process proceeds to step S85.

In step S85, the threshold value control unit 53 determines whether there are a plurality of facial expressions that the smallest number of people have. In step S85, when it is determined that there is only one facial expression that the smallest number of people have, the process proceeds to step S86. In step S86, the threshold value control unit 53 lowers the threshold value of the facial expression determined as that the smallest number of people have by one step, and supplies the extraction unit 55 with the evaluation values of the facial expression 1 to the facial expression 3 and the respective threshold values corresponding to the respective evaluation values, and then the process proceeds to step S89.

For example, when the number of the facial expression 1 (a smiley face) is three, the number of the facial expression 2 (a crying face) is two and the number of the facial expression 3 (a proud face) is two, it is determined that there are a plurality of facial expressions that the smallest number of people have, and then the process proceeds to step S87.

Here, the information of the position of the face detected by the face detection unit 51 is supplied to the threshold value control unit 53 through the facial expression evaluation unit 52. In step S87, the threshold value control unit 53 determines whether there is a facial expression of a person who is closest to the center of the angle of view out of the facial expressions that the smallest number of people have. For example, when the person closest to the center of the angle of view has a crying face, it is determined that there is the facial expression (the facial expression 2: a crying face) of the person closest to the center of the angle of view, out of the facial expressions that the smallest number of people have, and then the process proceeds to step S88.

In step S88, the threshold value control unit 53 lowers the threshold value of the facial expression (the facial expression 2: a crying face) of the person closest to the center of the angle of view out of the facial expressions that the smallest number of people have by one step, supplies the extraction unit 55 with the evaluation values of the facial expression 1 to the facial expression 3 and the respective threshold values corresponding to the respective evaluation values, and then the process proceeds to step S89.

In step S87, when it is determined that there is no a facial expression of a person who is closest to the center of the angle of view out of the facial expressions that the smallest number of people have, the step S88 is skipped, and then the process proceeds to step S89. At this time, the threshold value control unit 53 supplies the extraction unit 55 with the evaluation values of the facial expression 1 to the facial expression 3 and the respective threshold values corresponding to the respective evaluation values.

In step S89, the extraction unit 55 determines whether the evaluation value of each facial expression respectively exceeds the corresponding threshold value. In step S89, when it is determined that the evaluation values of each facial expression respectively exceeds the corresponding threshold value, the process proceeds to step S90. In step S90, the extraction unit 55 extracts the image from the image data which is input. The extraction unit 55 supplies the recording unit 30 with the extracted (that is, the shutter process is performed) image data, and allows the extracted data to be recorded thereon.

Further, in step S89, when it is determined that there is at least one expression of which the evaluation values does not exceed the corresponding threshold value, the step S90 is skipped, and then the process proceeds to step S91.

Alternatively, in step S82, when the face detection unit 51 determines that the number of people within the angle of view is zero, the steps S83 to S90 are skipped, and then the process proceeds to step S91.

In step S91, the face detection unit 51 determines whether there is a process end instruction from the user through the operation unit 31. In step S91, when there is not the process end instruction, the process returns to step S82, and subsequent processes are repeated.

In step S91, when it is determined that there is the process end instruction, the imaging process using automatic imaging mode is ended.

As described above, when it is determined that there are a plurality of facial expressions that the smallest number of people have, it is configured to lower the threshold value of the same facial expression as the facial expression of the person closest to the center of the angle of view, out of a plurality of facial expressions. Accordingly, the above fact increases the possibility of obtaining the image including the facial expression which the smallest number of people have and in which the facial expression of the person who is in the center of the angle of view is included.

For example, a central character may be mostly located in the center of the angle of view, like a bride and a bridegroom being located in the center of the angle of view in a wedding ceremony. Accordingly, the above fact increases the possibility of obtaining the image including various facial expressions of the central character.

Figure 6:
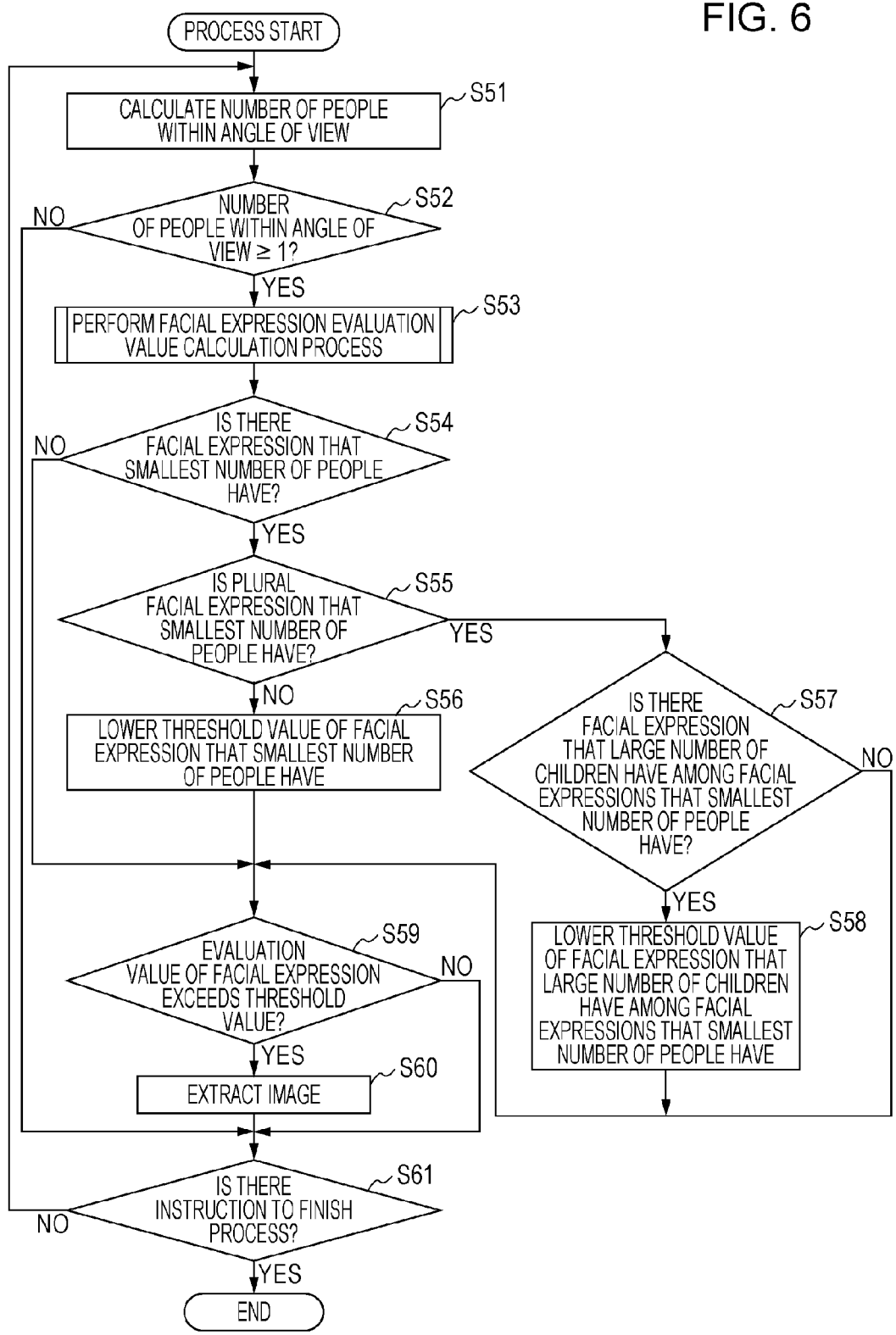
FIG. 6 is a flowchart illustrating another example of the imaging process using an automatic imaging mode.
Figure 7:
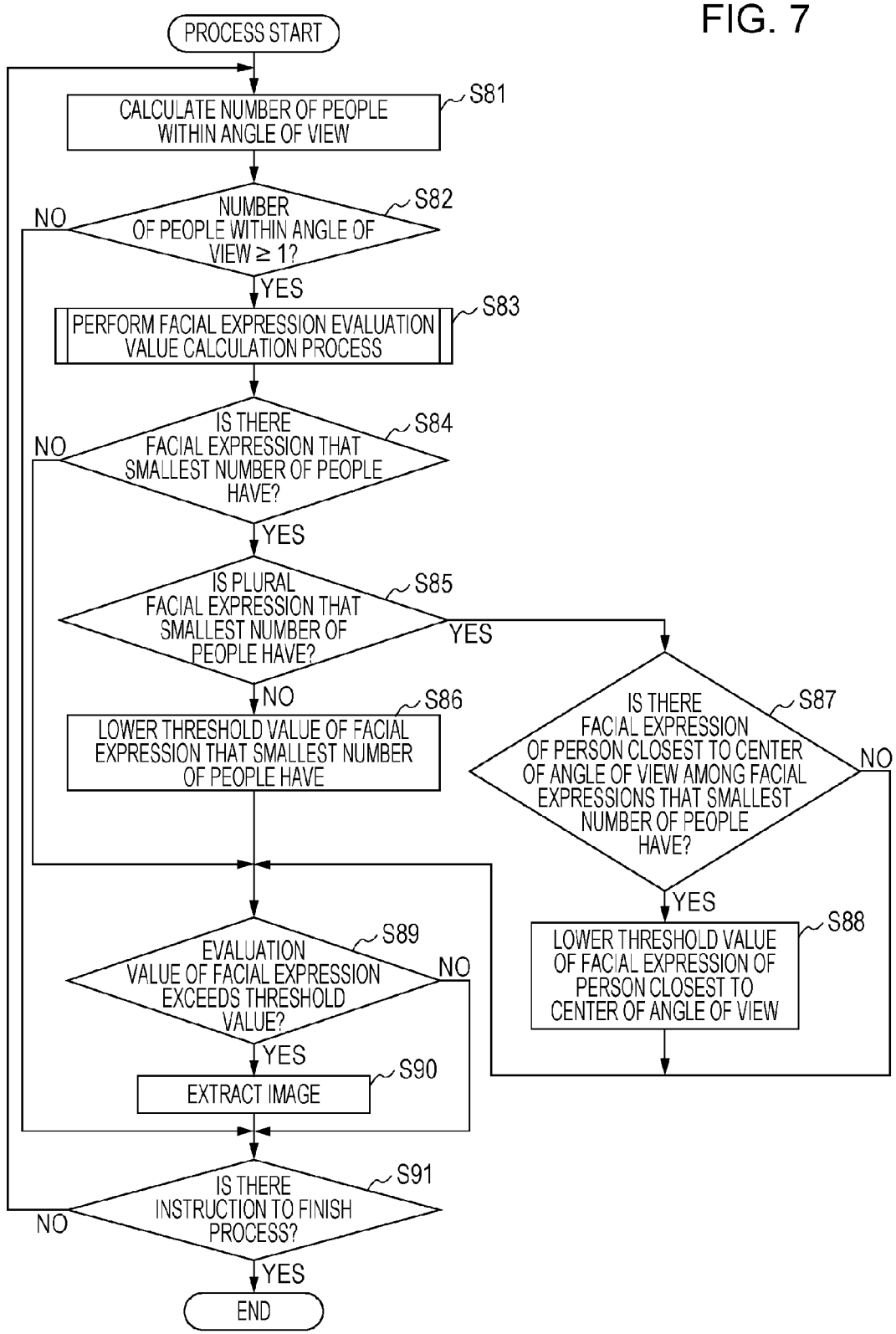
FIG. 7 is a flowchart illustrating still another example of the imaging process using an automatic imaging mode.

In addition, the example of children priority in FIG. 6 and the example of the center priority of the angle of view in FIG. 7 may be performed in parallel. In this case, for example, in the case of "No" in step S57 in FIG. 6, steps S87 and S88 in FIG. 7 may be inserted. In contrast, in the case of "No" in step S87 in FIG. 7, steps S57 and S58 in FIG. 6 may be inserted.

In addition, the present technology is applicable to a function of automatically releasing the shutter in many times using the camera platform 12. This function is described in Japanese Unexamined Patent Application Publication No. 2011-030163. An example of a case where the present technology is applied in this function will be described below as an automatic imaging mode using the camera platform 12.

Example of an Imaging Process Using an Automatic Imaging Mode Using the Camera Platform The imaging apparatus 11 sets an operation mode of a camera to the automatic imaging mode, using the camera platform 12. Accordingly, in the imaging apparatus 11, that uses the camera platform 12 as a result of rotating the imaging apparatus 11 in the right and left direction (pan: a horizontal direction) or raising or lowering the angle of view of the imaging apparatus 11 (tilt: vertical direction), various objects in the vicinity of the imaging apparatus 11 are captured multiple times.

That is, in the imaging process, in a case of an automatic imaging mode using the camera platform 12, the shutter process (an image extraction) is frequently repeated until there is the process end instruction. Thus, in this case, the threshold value control unit 53 operates as a threshold value adjustment unit which performs an adjustment process to adjust the standard (threshold value) that is changed prior to return to the original value, each time when determining whether the evaluation value of the facial expression exceeds the threshold value.

Next, an example of the imaging process in the automatic imaging mode using the camera platform 12 of the imaging apparatus 11 will be described referring to a flowchart in FIG. 8. In addition, the steps S111 to S117 in FIG. 8 fundamentally are the same as the steps S11 to S17 in FIG. 4, and the detailed description is repeated so that the description will be omitted.

After it is determined that the evaluation value of each facial expression exceeds the respective threshold value in step S116 and the image is extracted in step S117, the process proceeds to step S118. Alternatively, after it is determined that at least one evaluation value of each facial expression does not exceed the corresponding threshold value in step S116, the process proceeds to step S118.

In step S118, the threshold value control unit 53 performs a threshold value adjustment process. An example of the threshold value adjustment process will be described referring to a flowchart in FIG. 9.

In step S131, the threshold value control unit 53 determines whether the image is extracted in step S117. In step S131, when it is determined that the image is extracted, the process proceeds to step S132.

In step S132, the threshold value control unit 53 raises the threshold value of the facial expression. In addition, the facial expression as an object of which the threshold value is adjusted may be the facial expression of which the threshold value is lowered in step S115, the facial expression that a small number of people have, or the facial expression of which the evaluation value is highest, compared to the predetermined threshold value. That is, the facial expression of an object of which the threshold value is raised is not limited to the above facial expressions, but various methods are applicable.

In addition, the standard adjustment method is not limited to a method of raising the threshold value which is similar to the standard change method, but, for example, a method of lowering the threshold value or an adjustment of a gain with respect to the evaluation value is acceptable.

On the other hand, in step S131, when it is determined that the image is not extracted in step S117, step S132 is skipped, the threshold value adjustment process is ended, and then the process proceeds to step S119.

In step S119, the face detection unit 51 determines whether there is a process end instruction from the user through the operation unit 31. In step S119, when there is not a process end instruction, the imaging process returns to step S111, and the subsequent processes are repeated. Further, in a case of the automatic imaging mode using the camera platform 12, prior to this step S111, the control unit 25 controls the operations of the focusing unit 26, the iris unit 27, the zoom unit 28 and the camera platform 12 connected through the camera platform corresponding communication unit 33, and changes the range for imaging.

In step S119, when it is determined that there is the process end instruction, the process using the automatic imaging mode is ended.

As described above, in using the camera platform 12, it is configured to adjust the standard, every time when the image is extracted, so that the threshold value may be prevented from being excessively lowered. Further, capturing the same composition may be suppressed. Accordingly, without being limited to only the composition thereof, for example, the smiley face, various compositions may be captured.

Figure 9:
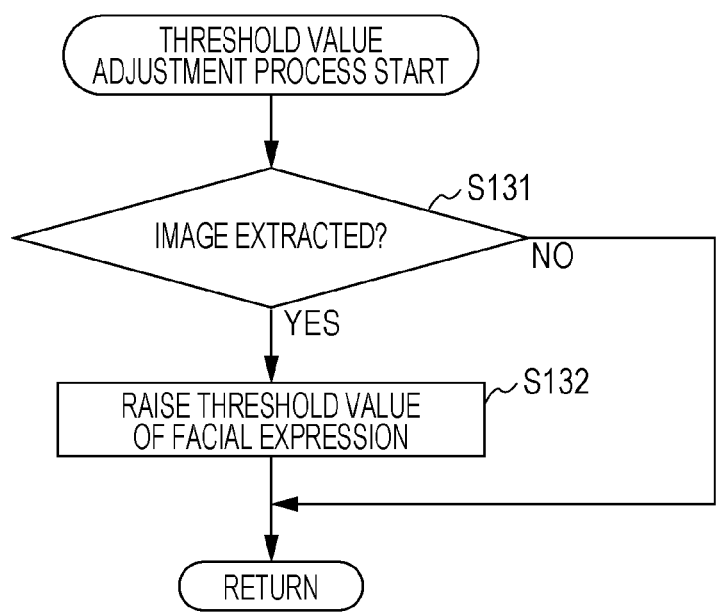
FIG. 9 is a flowchart illustrating an example of a threshold value adjustment process.

In addition, in the example of FIG. 9, the example of the process in the automatic imaging mode that is described above referring to FIG. 4 is explained as an example of a case of using the camera platform 12, but the process is not limited to the example. That is, even in a case of using the camera platform 12, the example of children priority described referring to FIG. 6 and the example of the center priority of the angle of view described referring to FIG. 7 may be performed.

Example of the Threshold Value Adjustment Process

Further, referring to a flowchart in FIG. 10, another example of the threshold value adjustment process of step S118 in FIG. 8 will be described. In addition, the steps S151 and S152 in FIG. 10 fundamentally are the same as the steps S131 to S132 in FIG. 9 so that the detailed description will be omitted.

Figure 8:
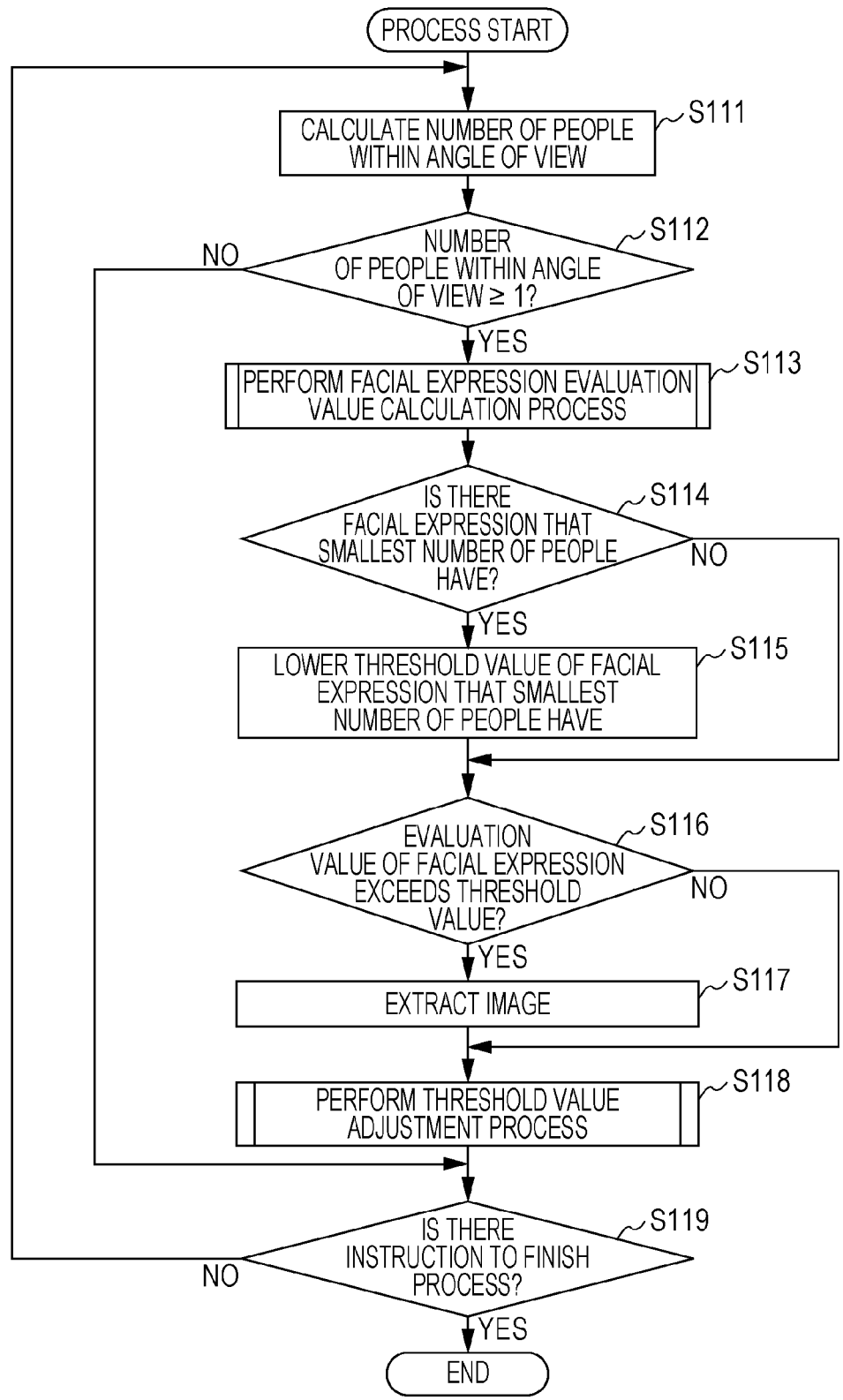
FIG. 8 is a flowchart illustrating an example of the imaging process using an automatic imaging mode using a camera platform.

In step S151, the threshold value control unit 53 determines whether the image is extracted in step S117 of FIG. 8. In step S151, when it is determined that the image is extracted, the process proceeds to step S152.

In step S152, the threshold value control unit 53 raises the threshold value of the facial expression, and then the process proceeds to step S153.

On the other hand, in step S151, when it is determined that the image is not extracted in step S117, the step S152 is skipped, and then the process proceeds to step S153.

In step S153, the threshold value control unit 53 determines whether the number of an embedded timer is N (a predetermined time) or more. In addition, the timer is started in step S156 described later.

In step S153, when it is determined that the number of the timer is N or more, that is, when it is determined that time elapses by N, the process proceeds to step S154. In step S154, the threshold value control unit 53 lowers the threshold value of the facial expression that is raised in step 152, and in step S155, the timer is set to zero.

In step S153, when it is determined that the number of the timer is less than N, that is, when it is determined that time does not yet elapse N, the steps S154 and S155 are skipped, and then the process proceeds to step S156.

In step S156, the threshold value control unit 53 starts the timer in step S156, and thus ends the threshold value adjustment process.

As described above, the threshold value which has been raised by the threshold value adjustment every time when the image is extracted, is lowered every predetermined time. Accordingly, for example, since there is a concern that the threshold value is excessively increased soon due to the fact that the threshold value has been raised by the threshold value adjustment every time when the image is extracted, it is possible to prevent the image from not being extracted.

Figure 10:
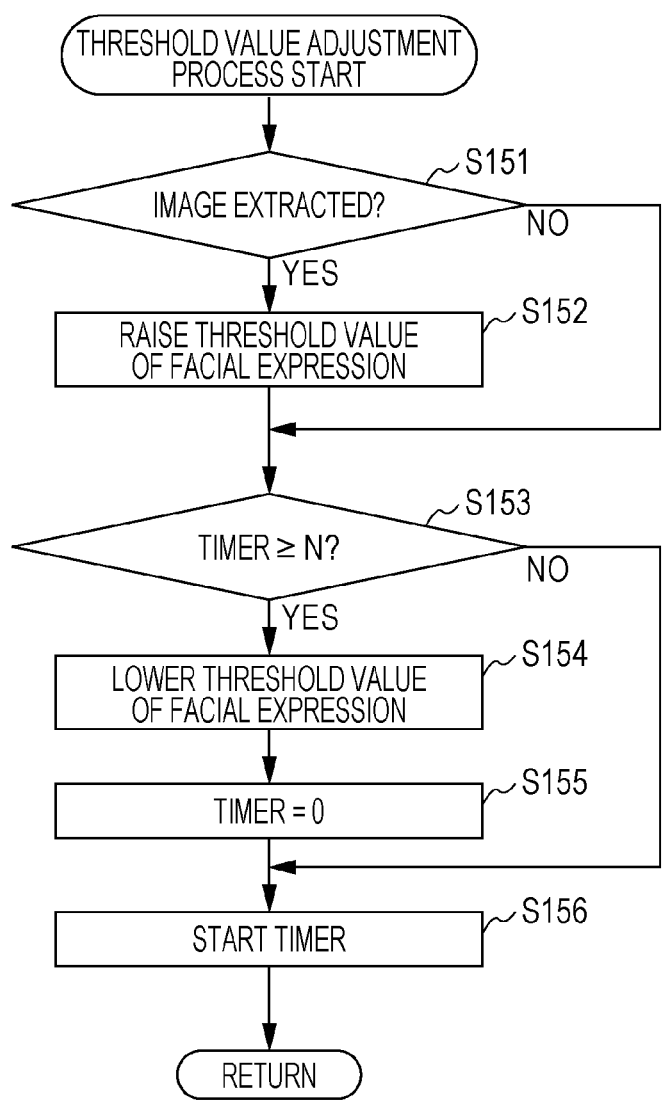
FIG. 10 is a flowchart illustrating another example of the threshold value adjustment process.

Further, in an example of FIG. 10, if a predetermined time elapses, the threshold value is lowered it is possible to configure that the number of times that the image is not extracted is counted, and if the time exceeds a predetermined number, the threshold value is lowered.

Furthermore, in the above explanation, as an example of an image extraction process, the example of performing a shutter process is explained, but the image extraction process is not limited to the shutter process. The image extraction in the present technology may be applied to an image extraction of a recorded image that is performed, for example, at the time of an image process of a recorded image, at the time of reproduction of a recorded image, or the like. Further, as an example, the present technology may be applied to a case where a determination of an image extraction is previously performed and stored as metadata, and then the image extraction is processed later.

In addition, as an example of an image extraction, it is described that a shutter is automatically released, but it is possible to use an instruction process to a user that indicates (instructs) to a user that now is a shutter chance, without releasing the shutter.

Further, as an instruction process to a user, the present technology may be applied to an indication (an audio output) to prompt a user to perform a certain process (in this case, an image extraction process) such as "This image may be extracted".

Furthermore, the present technology may be applied to a digital video camera recorder, without being limited to a still camera. In a case of being applied to the digital video camera recorder, for example, it is possible to record metadata together with a moving picture, extract a still picture from a moving picture, or apply metadata. The application of metadata corresponds to an extraction. Accordingly, it is possible to recognize an important image when reproducing an image. In addition, in a case of a digital video camera recorder, it is possible to extract one which meets the present condition (including application of metadata) while recording a moving picture.

The present technology may be applied to a case where a composition determination is not processed in a camera without a recording function, that is, a camera side, but is performed in a receiving side (a receiving side (a server) of a personal computer or a monitoring camera system).

Further, the present technology may be applied to a printer, an album, a thumbnail or a slide show.

That is, specifically, as a printer, it is considered to print out the image which is extracted based on the present technology from a plurality of images which are previously recorded. As an album or a slide show, it is considered to make an album or a slide show from a plurality of extracted images. In addition, an album is made of an image which is extracted based on the present technology. In addition, a view of a thumb nail is made of an extracted image, with an image extracted based on the present technology as a thumb nail.

The aforementioned series of processes may be implemented using hardware or software. In a case of implementing the aforementioned series of processes using software, programs which construct the software are installed from a program recording media into a computer incorporated into a dedicated hardware, a general purpose computer in which various programs are installed in order to perform various functions, or the like.

Configuration Example of a Computer

Figure 11:
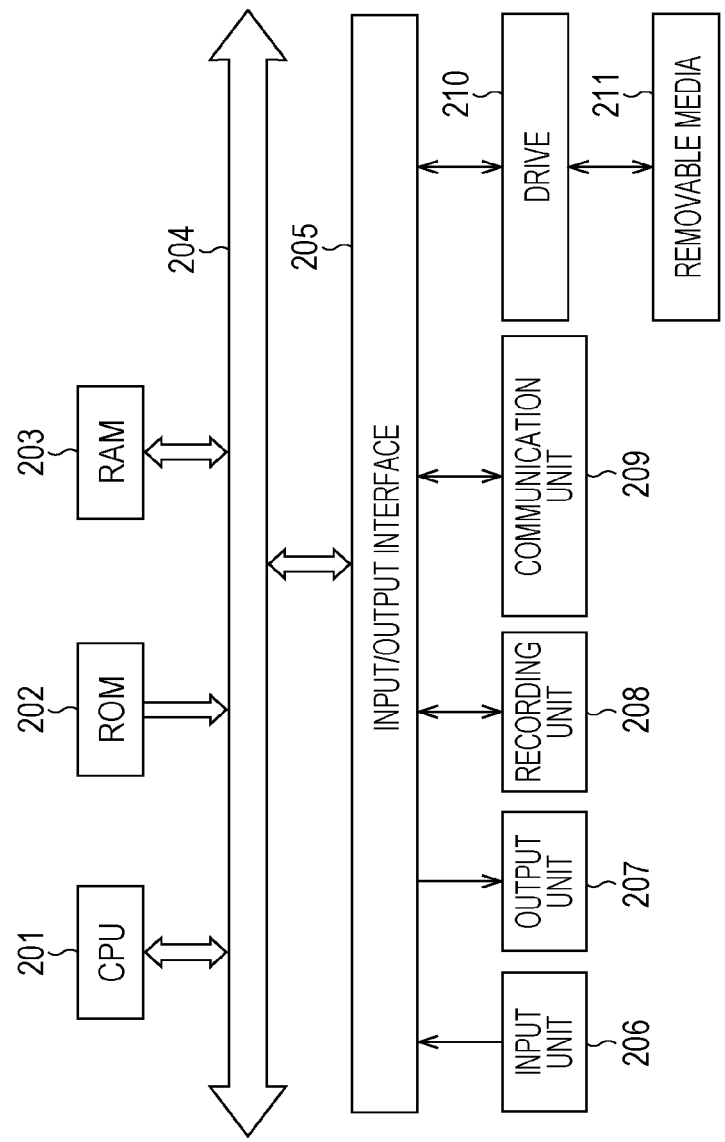
FIG. 11 is a block diagram illustrating a configuration example of a computer.

FIG. 11 is a block diagram illustrating a configuration example of hardware of a computer to execute a series of processes in a program.

In a computer, a Central Processing Unit (CPU) 201, a Read Only Memory (ROM) 202, and a Random Access Memory (RAM) 203 are connected to each other through a bus 204.

In addition, an input/output interface 205 is connected to the bus 204. An input unit 206, an output unit 207, a recording unit 208, a communication unit 209 and a drive 210 are connected to the input/output interface 205.

The input unit 206 includes a keyboard, a mouse, a microphone, and the like. The output unit 207 includes a display, a speaker and the like. The recording unit 208 includes a hard disk, a non-volatile memory, and the like. The communication unit 209 includes a network interface and the like. The drive 210 drives the removable media 211 such as a magnetic disk, an optical disk, a magneto-optical disk or a semiconductor memory.

In the computer configured like the above, the CPU 201 loads the program stored in the recording unit 208 to the RAM 203 through the input/output interface 205 and the bus 204 and performs the program, and thus the aforementioned series of processes are performed.

The program which is executed by the computer (CPU 201) may be recorded in the removable media 211 as, for example, a package media to be provided. In addition, a program may be provided through a wire or wireless transmission media such as a Local Area Network, Internet, or digital broadcasting.

In a computer, by mounting the removable media 211 in the drive 210, a program may be installed in the recording unit 208 through the input/output interface input/output interface 205. Further, a program may be received in the communication unit 209 through a wire or wireless transmission media and installed in the recording unit 208. In addition, a program may previously be installed in the ROM 202 or the recording unit 208.

Further, the program that the computer executes may be a program of which process is performed in time series along the order explained in the present disclosure or a program of which the process is performed in parallel or at the necessary timing such as when a call is received.

Further, in the present specification, the term of system means an overall apparatus configured by a plurality of devices, blocks, means, and the like.

Further, the embodiment in the present disclosure is not limited to the above embodiment, and various modifications may be made without departing from the spirit of the present disclosure.

Although the preferred embodiment of the present disclosure has been described above referring to the accompanying drawings, the disclosure is not limited the embodiment. It should be understood by those skilled in the art that various modifications, combinations, sub-combinations and alterations may occur depending on design requirements and other factors insofar as they are within the scope of the appended claims or the equivalents thereof.

Further, the present technology may have the following configurations.

(1) An image processing apparatus including a face detection unit which detects faces from an input image, an evaluation value calculation unit which calculates an evaluation value expressing a degree of a facial expression for each of the facial expressions of the faces detected by the face detection unit, and a control unit which changes a standard for extracting an image such that an image including the facial expressions, that a small number of people have, is easily extracted, based on the number of people for each of the facial expressions of the faces detected by the face detection unit and an evaluation value for each facial expression of the face calculated by the evaluation value calculation unit.

(2) In the image processing apparatus according to (1), when there are a plurality of facial expressions that a small number of people have, the control unit changes the standard such that an image including a facial expression, that a largest number of children have, is easily extracted out of facial expressions that a small number of people have.

(3) In the image processing apparatus according to (1) or (2), when there are a plurality of facial expressions that a small number of people have, the control unit changes the standard such that an image including a facial expression, which people having the facial expressions that a small number of people have are close to a center of an angle of view, is easily extracted out of facial expressions that a small number of people have.

(4) The image processing apparatus according to any one of (1) to (3) further includes an extraction unit which extracts an image including the facial expressions that a small number of people have, based on the standard changed by the control unit.

(5) In the image processing apparatus according to (4), the process by the extraction unit is a process of recording the input image.

(6) In the image processing apparatus according to (4), the process by the extraction unit is a process of automatically releasing a shutter.

(7) In the image processing apparatus according to (4), the process by the extraction unit is an instruction process to a user.

(8) In the image processing apparatus according to (4), the process by the extraction unit is a process of applying metadata.

(9) The image processing apparatus according to (4) further includes an imaging unit which captures an object and inputs the input image, and a camera platform control unit which controls an operation of a camera platform on which a casing including the imaging unit is installed.

(10) The image processing apparatus according to (9) further includes a standard adjustment unit which adjusts the standard changed by the control unit in a direction to return the standard to an original, when an extraction process is performed by the extraction unit.

(11) In the image processing apparatus according to (10), the standard adjustment unit adjusts the standard changed by the control unit in a direction to further change the standard, when a predetermined time elapses.

(12) In the image processing apparatus according to any one of (1) to (11), the control unit changes the standard for extracting the image, by lowering or raising a threshold value corresponding to the evaluation value.

(13) In the image processing apparatus according to any one of (1) to (11), the control unit changes the standard for extracting the image, by applying a gain to the evaluation value.

(14) An image processing method for an image processing apparatus includes detecting faces from input image, calculating an evaluation value expressing a degree of a facial expression for each of facial expressions of the detected faces, and changing a standard for extracting an image such that an image including the facial expressions, that a small number of people have, is easily extracted, based on the number of people for each of the facial expressions of the detected faces and an evaluation value for each facial expression of the calculated faces.

(15) A program for causing a computer to function as a face detection unit which detects faces from an input image, an evaluation value calculation unit which calculates an evaluation value expressing a degree of a facial expression for each of the facial expressions of the faces detected by the face detection unit, and a control unit which changes a standard for extracting an image such that an image including the facial expressions, that a small number of people have, is easily extracted, based on the number of people for each of the facial expressions of the faces detected by the face detection unit and an evaluation value for each facial expression of the face calculated by the evaluation value calculation unit.

The present disclosure contains subject matter related to that disclosed in Japanese Priority Patent Application JP 2012-048721 filed in the Japan Patent Office on Mar. 6, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
   a central processing unit (CPU) configured to:
   detect a plurality of faces of a number of people, each comprises a facial expression, from input image data;
   calculate an evaluation value, that expresses a degree of the facial expression, for each of a plurality of facial expressions of the detected plurality of faces;
   change, in an event only a first facial expression of the plurality of facial expressions is a facial expression that a smallest number of people have, only a first threshold value that corresponds to the first facial expression;
   change, in an event at least two facial expressions of the plurality of facial expressions are facial expressions that the smallest number of people have, only a second threshold value that corresponds to a second facial expression, among the at least two facial expressions, that a largest number of children have; and
   extract an image from the input image data in an event that each evaluation value, calculated for each of the plurality of facial expressions, exceeds the first threshold value in the event only the first facial expression of the plurality of facial expressions is the facial expression that the smallest number of people have or the second threshold value in the event at least two facial expressions of the plurality of facial expressions are facial expressions that the smallest number of people have.

2. The image processing apparatus according to claim 1, wherein the extracted image comprises a respective facial expression.

3. The image processing apparatus according to claim 1, wherein the extracted image corresponds to recorded image data.

4. The image processing apparatus according to claim 1, wherein the extraction of the image is based on a shutter that is configured to release automatically.

5. The image processing apparatus according to claim 1, wherein the extraction of the image is based on an instruction to a user.

6. The image processing apparatus according to claim 1, wherein the extraction of the image is based on an application of metadata.

7. The image processing apparatus according to claim 1, wherein the CPU is further configured to:
   capture an object and input the input image data; and
   operate a camera platform on which a casing, that includes a camera, is installed.

8. The image processing apparatus according to claim 1, wherein the CPU is further configured to:
   adjust, in an event that the image is extracted, the changed first threshold value or the changed second threshold value to return to an original value.

9. The image processing apparatus according to claim 1, wherein the CPU is further configured to:
   change the first threshold value or the second threshold value in an event a period of time elapses.

10. The image processing apparatus according to claim 1, wherein the change in the first threshold value is an increase or a decrease in the first threshold value.

11. The image processing apparatus according to claim 1, wherein the CPU is further configured to:
    change the first threshold value or the second threshold value, by application of a gain to a respective evaluation value.

12. An image processing apparatus, comprising:
    a central processing unit (CPU) configured to:
    detect a plurality of faces, each comprises a facial expression, from input image data;
    calculate an evaluation value, that expresses a degree of the facial expression, for each of a plurality of facial expressions of the detected plurality of faces;
    change, in an event only a first facial expression of the plurality of facial expressions is a facial expression that a smallest number of people have, only a first threshold value that corresponds to the first facial expression;
    change, in an event at least two facial expressions of the plurality of facial expressions are facial expressions that the smallest number of people have, only a second threshold value that corresponds to a second facial expression, among the at least two facial expressions, that people closest to a center of an angle of view have; and
    extract an image from the input image data in an event that each evaluation value, calculated for each of the plurality of facial expressions, exceeds the first threshold value in the event only the first facial expression of the plurality of facial expressions is the facial expression that the smallest number of people have or the second threshold value in the event at least two facial expressions of the plurality of facial expressions are facial expressions that the smallest number of people have.

13. An image processing method, comprising:
    in an image processing apparatus:
    detecting a plurality of faces, each having a facial expression, from input image data;
    calculating an evaluation value, expressing a degree of the facial expression, for each of a plurality of facial expressions of the detected plurality of faces;
    changing, in an event only a first facial expression of the plurality of facial expressions is a facial expression that a smallest number of people have, only a first threshold value corresponding to the first facial expression;
    changing, in an event at least two facial expressions of the plurality of facial expressions are facial expressions that the smallest number of people have, only a second threshold value corresponding to a second facial expression, among the at least two facial expressions, that a largest number of children have; and extracting an image from the input image data in an event that each evaluation value, calculated for each of the plurality of facial expressions, exceeds the first threshold value in the event only the first facial expression of the plurality of facial expressions is the facial expression that the smallest number of people have or the second threshold value in the event at least two facial expressions of the plurality of facial expressions are facial expressions that the smallest number of people have.

14. A non-transitory computer-readable storage medium having stored thereon a set of computer-executable instructions for causing a computer to perform operations, comprising:

detecting a plurality of faces, each having a facial expression, from input image data;

calculating an evaluation value, expressing a degree of the facial expression, for each of a plurality of facial expressions of the detected plurality of faces;

changing, in an event only a first facial expression of the plurality of facial expressions is a facial expression that a smallest number of people have, only a first threshold value corresponding to the first facial expression;

changing, in an event at least two facial expressions of the plurality of facial expressions are facial expressions that the smallest number of people have, only a second threshold value corresponding to a second facial expression, among the at least two first facial expressions, people closest to a center of an angle of view have; and extracting an image from the input image data in an event that each evaluation value, calculated for each of the plurality of facial expressions, exceeds the first threshold value in the event only the first facial expression of the plurality of facial expressions is the facial expression that the smallest number of people have or the second threshold value in the event at least two facial expressions of the plurality of facial expressions are facial expressions that the smallest number of people have.

15. The non-transitory computer-readable medium according to claim 14, wherein the change in the second threshold value is an increase or a decrease in the second threshold value.

16. A non-transitory computer-readable storage medium having stored thereon a set of computer-executable instructions for causing a computer to perform operations, comprising:

detecting a plurality of faces, each having a facial expression, from input image data;

calculating an evaluation value, that expresses a degree of the facial expression, for each of a plurality of facial expressions of the detected plurality of faces;

changing, in an event only a first facial expression of the plurality of facial expressions is a facial expression that a smallest number of people have, only a first threshold value corresponding to the first facial expression;

changing, in an event at least two facial expressions of the plurality of facial expressions are facial expressions that the smallest number of people have, only a second threshold value corresponding to a second facial expression, among the at least two facial expressions, that a largest number of children have; and extracting an image from the input image data in an event that each evaluation value, calculated for each of the plurality of facial expressions, exceeds the first threshold value in the event only the first facial expression of the plurality of facial expressions is the facial expression that the smallest number of people have or the second threshold value in the event at least two facial expressions of the plurality of facial expressions are facial expressions that the smallest number of people have.

* * * * *